United States Patent [19]

Geka

[11] Patent Number: 4,610,488

[45] Date of Patent: Sep. 9, 1986

[54] LINEAR MOTION BALL BEARING STRUCTURE

[75] Inventor: Toshiaki Geka, Funabashi, Japan

[73] Assignee: Nippon Thompson Co., Ltd., Tokyo, Japan

[21] Appl. No.: 686,130

[22] Filed: Dec. 26, 1984

[30] Foreign Application Priority Data

May 31, 1984 [JP] Japan ................................ 59-109573

[51] Int. Cl.$^4$ ............................................. F16C 29/06
[52] U.S. Cl. ..................................................... 384/45
[58] Field of Search ...................... 308/6 C, 6 R, 6 A; 464/168

[56] References Cited

U.S. PATENT DOCUMENTS

| 4,304,443 | 12/1981 | Hoffmann | 308/6 C |
| 4,432,587 | 2/1984 | Bryan | 308/6 C |
| 4,514,018 | 4/1985 | Teramachi | 308/6 C |

*Primary Examiner*—Lenard A. Footland

*Attorney, Agent, or Firm*—Alan H. MacPherson; Steven F. Caserza; Richard Franklin

[57] ABSTRACT

A linear motion ball bearing structure provided between a slider and a straight track rail for allowing the slider to move along a straight line of movement defined by the track rail is provided. The present linear motion ball bearing structure includes an endless travelling path in the slider and which includes a load path section, a return path section and a pair of connection path sections each connecting the corresponding ends of the load and return path sections, thereby defining a closed loop. Thus, the balls provided in the endless path roll from the load path section into the return path section through one of the connection path sections and then back into the load path section through the other of the connection path sections as the slider moves along the rail in one direction. The return path section is provided in the slider above and inward of the load path section, where the balls in the path are placed in rolling contact between the slider and the rail, so that the present structure may be made compact in size, particularly in its width.

6 Claims, 10 Drawing Figures

LINEAR MOTION BALL BEARING STRUCTURE

BACKGROUND OF THE INVENTION

1. Field of the Invention

The present invention generally relates to a ball bearing, and, in particular, to a ball bearing structure for allowing a slider to move smoothly along a straight rail.

2. Description of the Prior Art

A linear motion ball bearing is well known in the art. Such a linear motion ball bearing is typically provided between a straight rail and a slider thereby allowing the slider to move along the rail smoothly, and it is used in various fields, including manufacturing and transporting machinery and robots, whenever relative positional changes between elements along straight paths are required. The linear motion ball bearing is typically comprised of an endless travelling path, which is mostly defined in the slider excepting a load portion which is defined between the slider and the rail on which the slider is mounted for linear motion, and a plurality of balls rollably provided in the endless travelling path, so that the slider can move along the straight rail while the balls roll along the endless travelling path. Thus, with the provision of such a linear motion ball bearing, the slider can move along the straight rail in one direction no matter how long the rail may be, and the slider can also move along the rail back and forth as many times as desired.

Although such a linear motion ball bearing provides excellent in providing a friction-free contact between the slider and the guide rail along which the slider moves, the slider tends to be larger in width than the rail, i.e., in the direction transverse to the direction of movement of the slider, due to the provision of the endless travelling path for the rolling balls. That is, the endless travelling path for the balls includes a load section which is defined as a straight path portion opposite to a guide groove defined in the rail, a returning section extending generally in parallel with the load section and a pair of connecting sections each connected between the corresponding ends of the load and returning sections. The presence of such returning section necessarily tends to make the slider larger in width than the rail so that there are occasions were the application of such linear motion ball bearings is hindered because of this greater width.

SUMMARY OF THE INVENTION

It is therefore a primary object of the present invention to obviate the disadvantages of the prior art as described above and to provide an improved linear motion ball bearing structure.

Another object of the present invention is to provide a linear motion ball bearing structure more compact in size, in particular, in the widthwise direction (which is the direction transverse to the direction of movement of a slider along a rail).

A further object of the present invention is to provide a linear motion ball bearing structure which is relatively symmetrical in structure and thus comprised of increased number of common components, thereby allowing to lower its manufacturing cost.

A still further object of the present invention is to provide a linear motion ball bearing structure smooth in operation and sturdy in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
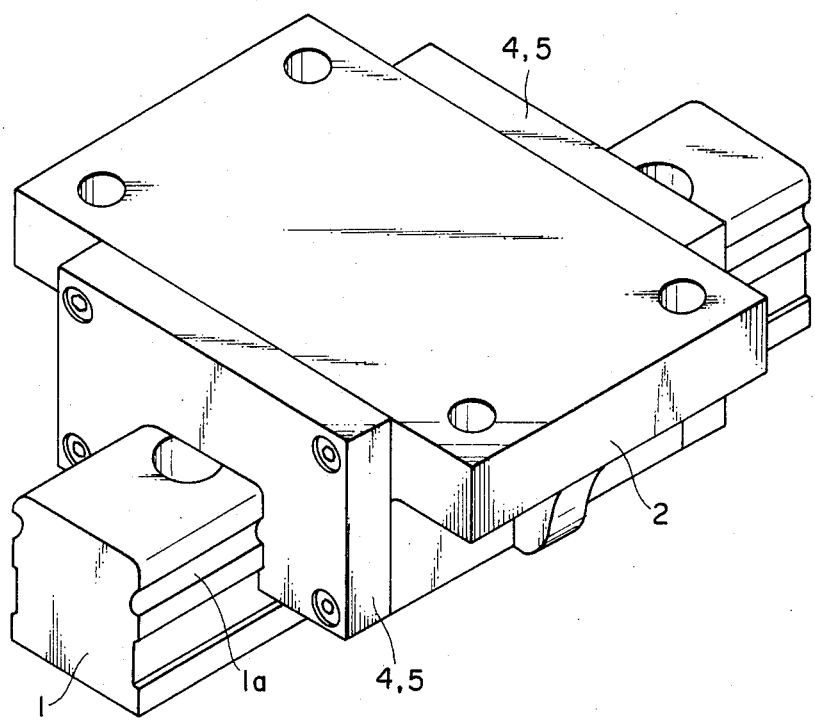
FIG. 1 is a perspective view showing a slider and rail assembly to which the present invention is applied for allowing the slider to move without friction along the rail.

Referring now to FIG. 1, there is shown a slider and rail assembly which is built in accordance with the principle of the present invention. As shown, the assembly includes a track rail 1 which extends straight, thereby defining a linear path along which a slider mounted on the rail 1 moves. The track rail 1 is generally square in cross section having top, bottom, and a pair of side surfaces, and is provided with a pair of guide grooves 1a, each extending in parallel with the longitudinal direction of the rail 1 and engraved on one of the pair of side surfaces thereof. The slider 2 straddles the rail 1 and is so mounted on the rail 1 that it can move along the rail virtually free of friction due to the linear motion ball bearing structure provided between the rail 1 and the slider 2 constructed in accordance with the principle of the present invention.

Figure 2:
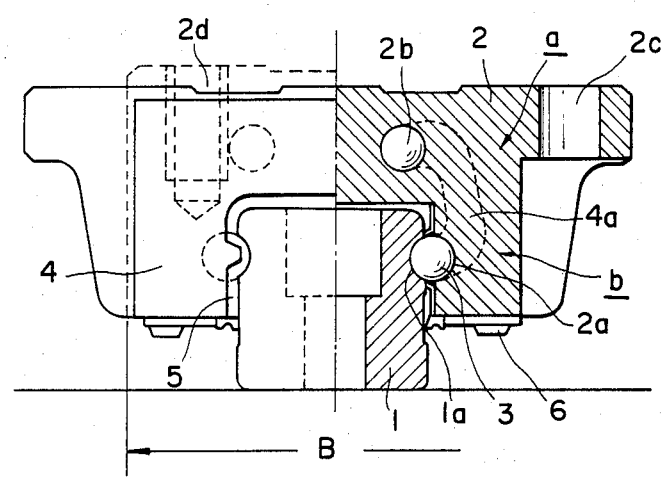
FIG. 2 is a transverse cross-sectional view showing how the present linear motion ball bearing structure is applied to the slider and rail assembly of FIG. 1.

FIG. 2 shows how the linear motion ball bearing structure in accordance with one embodiment of the present invention is incorporated into the slider and rail assembly of FIG. 1. As shown, the slider 2 is formed with an endless travelling path for endless movement of balls 3 as the slider 2 moves along the rail 1 linearly. The endless travelling path for the balls 3 is comprised of four sections: a load section 2a which extends straight in parallel with and opposite to the corresponding guide groove 1a of the rail 1, a return section 2b which extends generally in parallel with the load section 2a, and a pair of connection sections 4a, 4a each of which extends generally vertically for connecting the corresponding ends of the load and return sections 2a and 2b.

A sufficient number of balls provided in this endless travelling path so as to allow smooth relative movement between the rail 1 and the slider 2. The balls 3 advance by rolling along the endless path as the slider 2 moves along the rail 1. It is to be noted that the balls 3 are sandwiched between the rail 1 and the slider 2 at the load section 2a of the endless travelling path so that a rolling contact is insured at this section.

The slider 2 is provided with a pair of side plates 4, 4 one on each of front and rear sides of the slider 2, and, as will be described in detail later, the connection portion of the endless travelling path is defined in each of the side plates 4, 4. A side seal 5 is also provided to cover the corresponding side plate 4. Moreover, the slider 2 is also provided with a bottom seal 6 which is fixedly attached to the bottom of the slider 2.

In the prior art the return section 2b of the endless travelling path for the balls 3 has been customarily located at position a or b as indicated in FIG. 2. It is true that the provision of the return section 2b at position a or b allows the slider 2 to be lower in height, but it necessary makes the slider 2 in addition, greater in width. The rail 1 is normally fixed in space. Another component is normally mounted on the slider 2 so that the slider 2 is typically provided with mounting holes, such as 2c indicated by the solid line or 2d indicated by the dotted line in FIG. 2. The mounting hole 2c is a through-hole; whereas, the mounting hole 2d is a counter bore, which is normally threaded. Thus, in order to provide such mounting holes without lessening the strength of the slider 2 itself, the slider 2 must be made larger in size, in particular in its width.

However, in accordance with the present invention, the endless travelling path for the balls 3 is so defined in the slider 2 that the return section 2b of the endless travelling path is located above and inward of the load section 2a of the endless travelling path, as best shown in FIG. 2. As mentioned above, the load section 2a of the endless travelling path is defined by a groove or channel engraved in the slider 2 opposite to the guide groove 1a of the rail 1, which extends straight horizontally in parallel with the guide groove 1a. The return section 2b may be defined as a tunnel-shaped channel provided through the body of the slider 2, and it may be straight or curved. In the illustrated embodiment, the return section 2b is a straight tunnel-shaped channel, which extends horizontally in parallel with the load section 2a. Of importance, however, the return section 2b is located above and generally inward of the load section 2a. Thus, the pair of connection sections 4a, 4a, each connecting the corresponding ends of the load and return sections 2a and 2b, extend generally upwardly but somewhat inclined inwardly. Here, it is to be noted that the inward direction indicates the direction toward the center of the slider 2.

Figure 3:
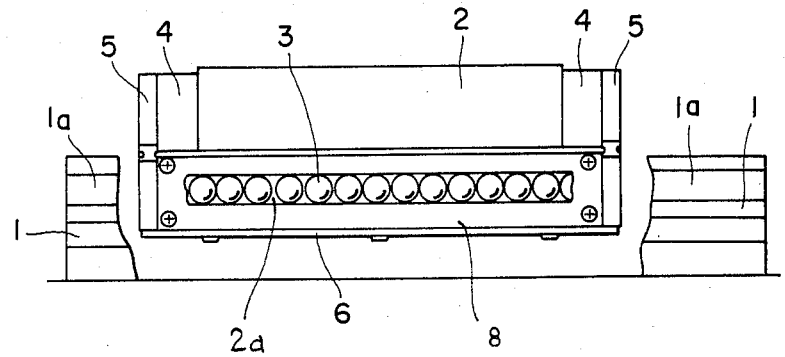
FIG. 3 is a side elevational view showing the slider and rail assembly of FIG. 1 with some parts removed.

As shown in FIG. 3, the balls 3 in the endless travelling path are in contact with adjacent balls. Since the balls 3 shown in FIG. 3 are those located at the load section 2a of the endless travelling path, the balls 3 are arranged along a straight line and partly received in the guide groove 1a. Thus, as the slider 2 moves to the left or to the right along the rail 1, the balls 3 roll along the load section 2a to the left or to the right into the connection section 4a which is defined in the side plate 4. Then, since the return path 2b is defined in the slider 2 extending between the connection paths 4a, 4a in the side plates 4, 4 on the front and rear sides of the slider 2, the balls 3 move into the return path 2b from one of the connection paths 4a, 4a, and, then, after passing the other connection path 4a, the balls 3 again enter the load path 2a. In this manner, the balls 3 rollingly circulate in a closed loop to allow a relative linear motion between the slider 2 and the rail 1.

Figure 4:
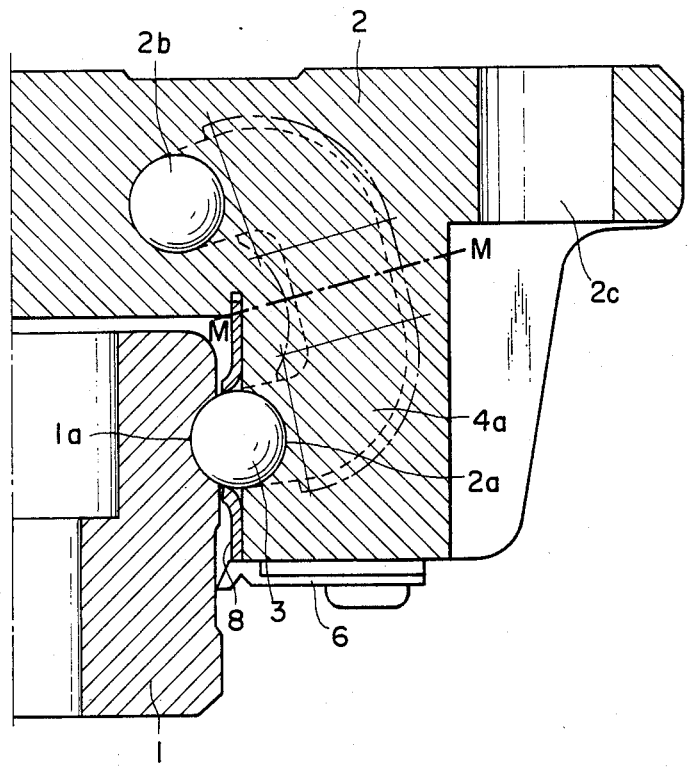
FIG. 4 is an enlarged view showing part of the structure shown in FIG. 2.
Figure 6A:
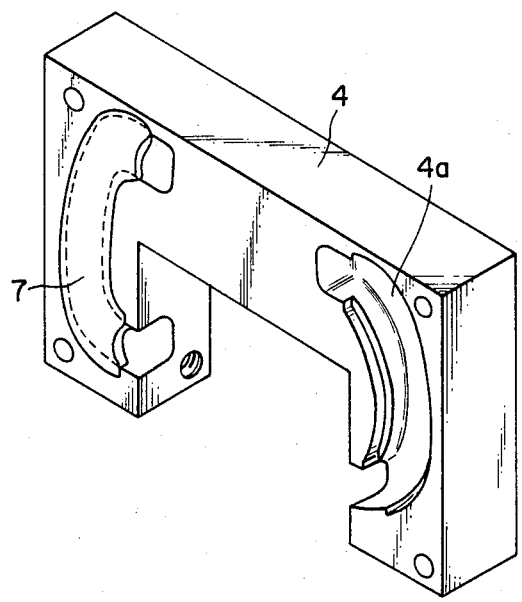
FIG. 6a is a perspective view showing the detailed structure of a side plate 4 forming part of the slider of the slider and rail assembly of FIG. 1.
Figure 6B:
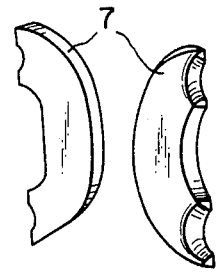
FIG. 6b is a schematic illustration showing the detailed structure of a guide plate 7 to be provided in the side plate 4 for defining the connecting path portion of an endless travelling path for balls.

As best shown in FIGS. 4 and 6a, the connection path section 4a is a channel engraved in one side surface of the side plate 4. In the illustrated embodiment, the connection section 4a is generally in the shape of a C or inverter C, and its shape is chosen to be symmetrical with respect to the center line M—M. As shown in FIG. 6b, a guide plate 7, which is also generally in the shape of a C or inverted C is commensurate with the shape of the connection path section 4a. The guide plate 7 is fixedly attached to the surface of the slide plate 4 thereby making the connection path section 4a in the form of a tunnel. It is to be noted that the top and bottom ends of the plate 7 are beveled so that the balls 3 may be smoothly lead into and out of the connection path section 4a. Importantly, since the connection path section 4a is symmetrical with respect to its center line M—M, the guide plate 7 is symmetrical with respect to its center line. Thus, the guide plate 7 may be used interchangeably for any of the four connection path sections 4a provided in the illustrated slider 2. This aspect is particularly advantageous from a manufacturing viewpoint.

Figure 5:
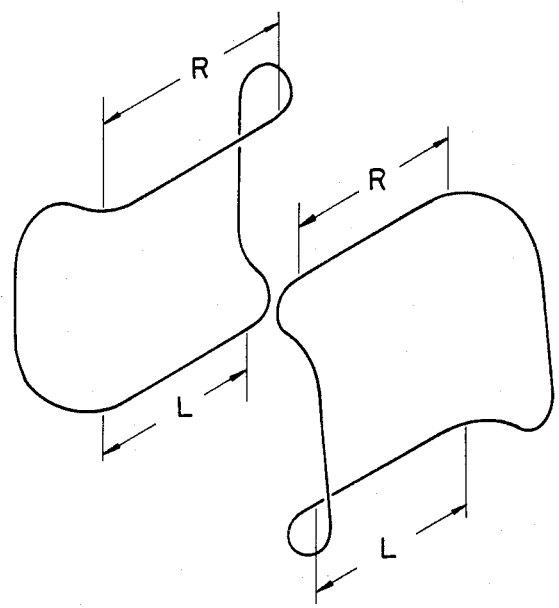
FIG. 5 is a schematic illustration showing the locus of each of the pair of endless travelling paths for the rolling balls provided in the slider of the slider and rail assembly shown in FIG. 1.

FIG. 5 schematically indicates the general shape of the pair of endless travelling paths provided in the illustrated slider 2. In FIG. 5, the load path section is indicated by "L" and the return path section is indicated by "R" with the rest indicating the connection path section. As mentioned above, the balls 3 roll along the endless travelling path while the slide 2 moves linearly along the rail 1.

Figure 7A:
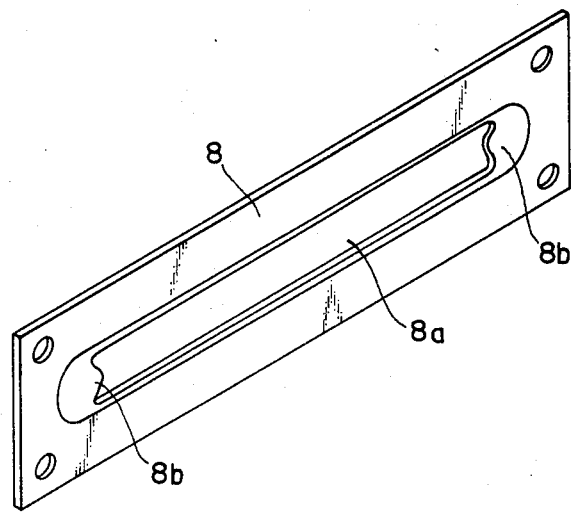
FIG. 7a is a perspective view showing the detailed structure of a holder plate 8 to be mounted on the slider 2 along the load portion of the endless travelling path for preventing the balls from falling off the endless travelling path.
Figure 7B:
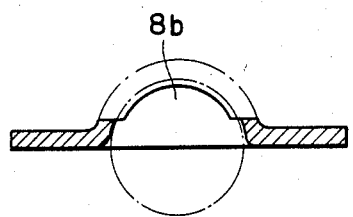
FIGS. 7b and 7c are schematic illustrations showing how the balls are held in position by the holder plate 8.
Figure 7C:
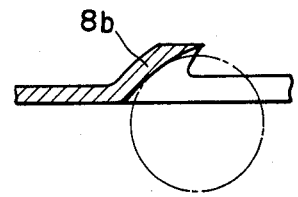

FIG. 7a illustrates a holder plate 8 which is fixedly attached to the body of the slider 2 extending along the load path section 2a, as best shown in FIGS. 3 and 4. The holder plate 8 is elongated in shape and formed with an elongated slot 8a whose width is somewhat smaller than the diameter of the balls 3 thereby preventing the balls 3 from falling off when they move along the load path section 2a. The provision of such an elongated slot 8a is necessary for allowing the balls 3 at the load section 2a to be in rolling contact with the guide groove 1a of the rail 1. The holder plate 8 is also formed with a pair of guide tongues 8b, 8b one at each end of the slot 8a. The guide tongues 8b, 8b are suitably curved in shape, thereby allowing the balls 3 to move into or out of the load path section 2a smoothly.

As described above, in accordance with the present invention, there is provided a linear motion ball bearing structure whose width is minimized. In addition, the symmetrical endless path for the balls 3 contributes to increase the number of commonly useable components, which in turn allows for a simpler and less expensive manufacturing process. Furthermore, in accordance with the present invention, since the connection path section may be made relatively longer, the radius of curvature may be made relatively larger, which then assures smooth movement of the balls with a minimum of frictional effect.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion bearing structure for allowing a first member having a pair of first vertical walls spaced apart from each other to move along a second member having a pair of second vertical walls each of which faces opposite to the corresponding one of said pair of first vertical walls and each of which is provided with at least one straight guide groove, comprising:

endless path means defined in said first member for each of said at least one straight guide groove, said endless path means including a load path section defined in the corresponding one of said first vertical walls and located between the top and bottom of said first vertical walls and in parallel with said straight guide groove, a return path section located above and inward of said load path, and a pair of connection path sections each connecting the corresponding ends of said load and return path sections and including a pair of curved portions, which extend as curved radially outwardly with respect to a longitudinal axis of said first member from the respective corresponding ones of said load and return path sections to respective outward points, and an intermediate portion which extends between said respective outward points; and a plurality of rolling means provided in said endless path means, said rolling means being capable of rolling along said endless path means as said first member moves along said second member, whereby said rolling means are placed in rolling contact between said first and second members while moving through said load paths section.

2. The structure of claim 1 wherein said plurality of rolling means include a plurality of balls.

3. The structure of claim 1 wherein each said connection path section is defined to be symmetrical in shape with respect to its center line.

4. The structure of claim 1 wherein said second member is in the form of a straight rail which is provided with said guide groove one at each of opposite side surfaces thereof, and said first member straddles said rail-formed second member and is provided with a pair of said endless path means defined therein as being located symmetrically with respect to its center line, whereby each of the endless path means is associated with the corresponding one of the guide grooves provided in said rail-formed second member.

5. The structure of claim 4 wherein said endless path means includes a holder plate fixedly attached to said first member, said holder plate being provided with an elongated slot whose width is somewhat smaller than the size of said rolling means thereby allowing said rolling means to come into rolling contact with said guide groove of said second member through said slot.

6. The structure of claim 5 wherein said holder plate is also provided with a pair of guide tongues each located at one end of said elongated slot thereby insuring that said rolling means moves into or out of said load section smoothly.

* * * * *